INVENTORS
MAURITS TEN BOSCH
PAUL H. LANG
BY
Henry L. Shenier
ATTORNEY

Nov. 27, 1951     M. TEN BOSCH ET AL     2,576,863
TORQUE AMPLIFIER
Filed Feb. 1, 1950     2 SHEETS—SHEET 2
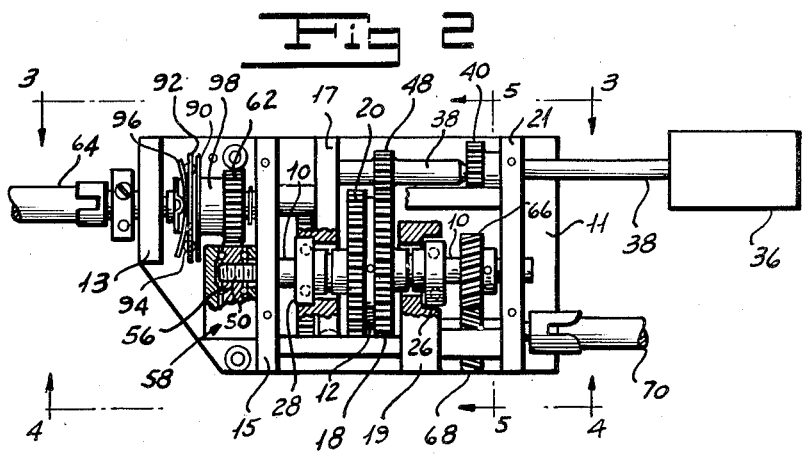
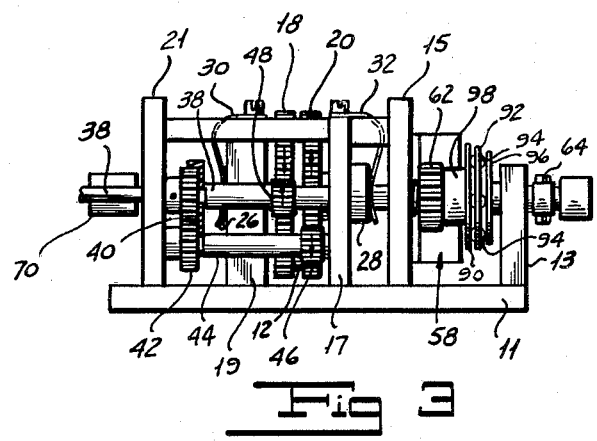
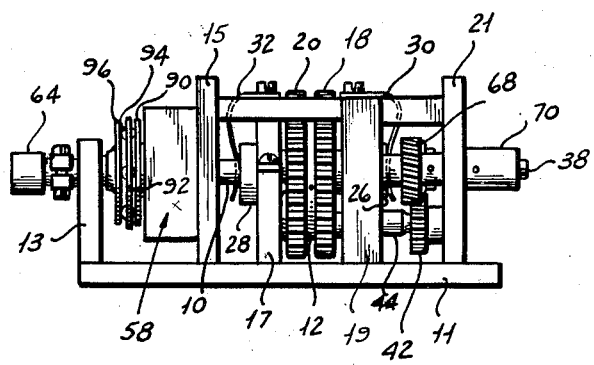
INVENTORS
MAURITS TEN BOSCH
PAUL H. LANG
BY
ATTORNEY Patented Nov. 27, 1951

2,576,863

UNITED STATES PATENT OFFICE 2,576,863

TORQUE AMPLIFIER

Maurits ten Bosch, White Plains, and Paul H. Lang, Katonah, N. Y., assignors to The Norden Laboratories Corporation, White Plains, N. Y., a corporation of Connecticut Application February 1, 1950, Serial No. 141,797

12 Claims. (Cl. 74—388)

Our invention relates to torque amplifiers and more particularly to an improved construction in which an input shaft may be turned by means of the application of a very small torque to produce a corresponding rotation of an output shaft with greatly increased torque and in which the output shaft will follow the input shaft both in amplitude or angular velocity and direction of rotation.

Torque amplifiers are used in many applications where it is desired to do work requiring controlled movement and where there is available only a very small input torque to accomplish the work. There are many applications in which torque amplifiers may be used, such as in computors, fire control instruments, bomb sights, and the like. They may be used for all types of control systems, as for example, in airplane control systems where a small torque applied to a control by a pilot will result in the production of a large torque at the control surface.

Many types of torque amplifiers are known to the art, and many of them are complicated in construction and expensive to manufacture.

One object of our invention is to provide a torque amplifier of simple construction which is certain in its operation and easy to maintain.

Another object of our invention is to provide a torque amplifier which is inexpensive to manufacture and which can deliver greatly increased outputs from comparatively small inputs over extended periods of time.

A further object of our invention is to provide a torque amplifier in which the input will always be substantially in phase with the output.

Other and further objects of our invention will appear from the following description.

In the accompanying drawings which form part of the instant specification and which are to be read in conjunction therewith, and in which like reference numerals are used to indicate like parts in the various views:

Figure 3 is a rear elevation of the torque amplifier shown in Figure 2 viewed along the line 3—3 of Figure 2.

Figure 4 is a front elevation of the torque amplifier shown in Figure 2 viewed along the line 4—4 of Figure 2.

Figure 5 is a sectional view drawn on an enlarged scale taken along the line 5—5 of Figure 2.

In general our invention contemplates the provision of a prime mover adapted to drive a pair of gears in opposite directions and at the same angular velocity. The gears are mounted for rotation about and axial movement relative to a shaft, and positioned on each side of a clutch disk provided with facing material adapted to coact with surfaces formed on the gears such that the coacting friction surfaces will have a coefficient of friction substantially a rising function of the relative speed between driving and driven means. We have found that cork or leather against metal surfaces will produce this characteristic. Springs are provided for urging the oppositely rotating gears into contact with the friction surfaces of the clutch disk which is secured to the shaft for rotation therewith. Normally the arrangement is such that the shaft is stationary, each of the gears exercising an equal and opposite torque on the shaft through the clutch disk. A nut provided with external teeth is mounted in a suitable thrust bearing surrounding the threaded end of the shaft. Rotation of the nut in one direction or the other will move the shaft axially of its axis of rotation to increase the pressure between the clutch disk and one or the other of the rotating gears. The pitch of the threads of the nut and shaft end are such that the rotation of the shaft produced by the increased pressure with one or the other of the rotating gears will produce a rotation of the shaft to bring the shaft back so that the clutch plate will move to its neutral position. In this manner continued rotation of the nut will produce continued rotation of the shaft in the direction of rotation and at the same angular velocity. Due to the fact that the output of the prime mover drives the shaft, the torque upon the shaft will be greatly increased over the input torque which controls the direction and amount of rotation. Since the clutch surfaces are constantly in engagement with the friction surfaces formed on the rotating gears and are in a position of dynamic balance, movement of the output shaft will commence the instant position of equilibrium is disturbed so that no appreciable lag takes place in the operation of our torque amplifier.

Figure 1:
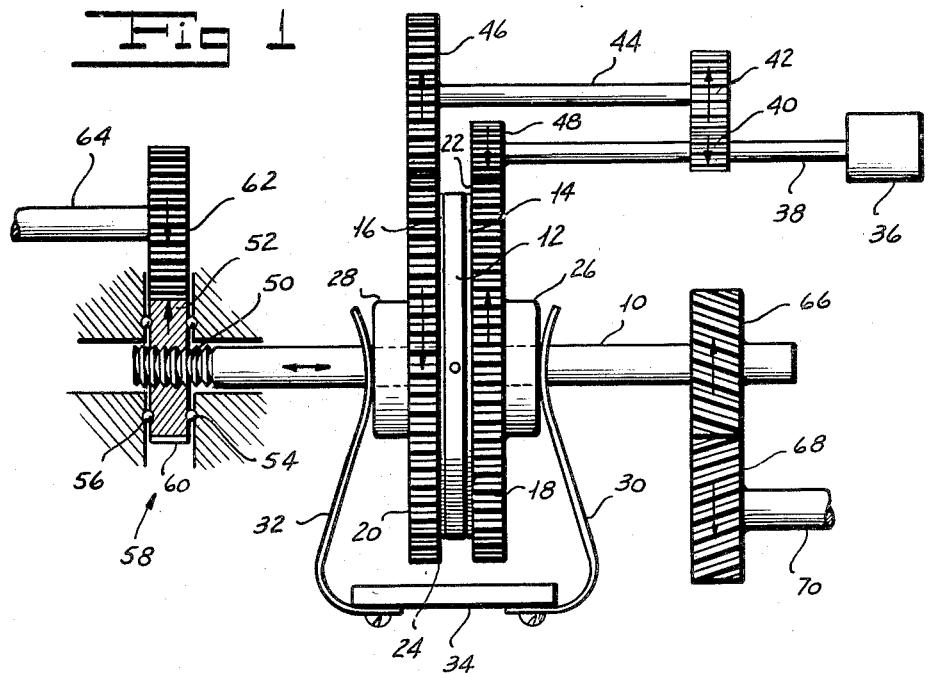
Figure 1 is a diagrammatic view showing a torque amplifier containing one embodiment of our invention.

Referring now to Figure 1, a shaft 10 is mounted for rotary and axial movement in suitable bearings (not shown). The shaft carries a clutch plate 12 provided with facings 14 and 16 of cork or leather or any other suitable material having a coefficient of friction rising as a function of slip velocity. A pair of gears 18 and 20 are mounted on the shaft 10 for rotation with respect thereto and for axial movement therealong. The gear 18 is formed with a surface 22 adapted to contact the clutch facing 14. The gear 20 is formed with a surface 24 adapted to contact the clutch facing 16. A gear hub 26 is formed integrally with the gear 18 and a gear hub 28 is formed integrally with the gear 20. The gears are urged towards each other by a pair of springs 30 and 32 mounted on any suitable support 34. A prime mover which may be an electric motor or the like 36 drives a shaft 38 at constant speed. A gear 40 meshes with a larger gear 42 secured to a shaft 44 for rotation therewith, which shaft carries a gear 46 meshing with the clutch gear 20. The shaft 38 carries a gear 48 meshing with the gear 18. It will be observed that the gear 46 rotates in a direction opposite from the gear 48 due to the interposition of the idler gear 42 which reverses the direction of rotation. The relationship between gears 40 and 42 and 46 and 20 is such that gear 20 will rotate at the same speed driven by means of gears 40, 42 and 46 as does 18 driven from gear 48. One end of the shaft 10 is provided with screw threads 50 engaging a nut 52 mounted in a suitable thrust bearing indicated generally by the reference numeral 58. The thrust bearing 58 is provided with balls 54 and 56 on each side thereof to prevent movement of the nut 52 axially of the shaft 10. The nut is provided with gear teeth 60 externally thereof meshing with a gear 62 carried by the input shaft 64. The other end of shaft 10 carries a gear 66 which meshes with a gear 68 carried by an output shaft 70. With the parts in the position shown in Figure 1, the spring pressure exercised by springs 30 and 32 being equal the gear 18 will tend to rotate the clutch plate 12 in one direction and the gear 20 will tend to rotate the clutch plate in the opposite direction. Since the friction is balanced no rotation of the clutch plate 12 and hence the shaft 10 will occur. Let us now assume that the input shaft 64 is rotated in the direction of the arrow shown in Figure 1, that is, in a clockwise direction viewed from the left. The nut 52 will be rotated in a counterclockwise direction viewed from the left and this will cause the shaft 10 to move to the right against the action of the spring 30 increasing the pressure between friction lining 14 and the surface 22 of the clutch gear 18. At the same time this occurs the pressure exercised by spring 32 and hence the pressure between the surface 24 of the clutch gear 20 and the friction lining 18 will be lessened. This unbalances the equilibrium and causes the clutch plate to rotate in the direction of clutch gear 18, that is, in a counterclockwise direction viewed from the left. This will rotate the gear 66 in a counterclockwise direction and the gear 68 in a clockwise direction so that the output shaft will rotate in the same direction as the input shaft 64 but with the torque applied from the motor 36 and the gearing. As soon as the shaft 10 rotates in a counterclockwise direction it will tend to move to the left through the interaction of the threads 50 and the nut 52. As long as the nut is rotating moving it to the right it will not be able to achieve the leftward motion. As soon as the nut stops rotating, however, at that instant the shaft will move to the left back to the position of equilibrium. The construction is such, therefore, that as long as the input shaft 64 is rotating the output shaft 70 will rotate in the same direction through the same amplitude and the same velocity but with increased torque. Gears 66 and 68 are helical gears and their slopes are such that a longitudinal thrust will be created by their interaction moving the shaft 10 to increase the frictional engagement between the clutch plate and the engaged rotating gear, thus enabling us to deliver a greater output for a given input.

Figure 2:
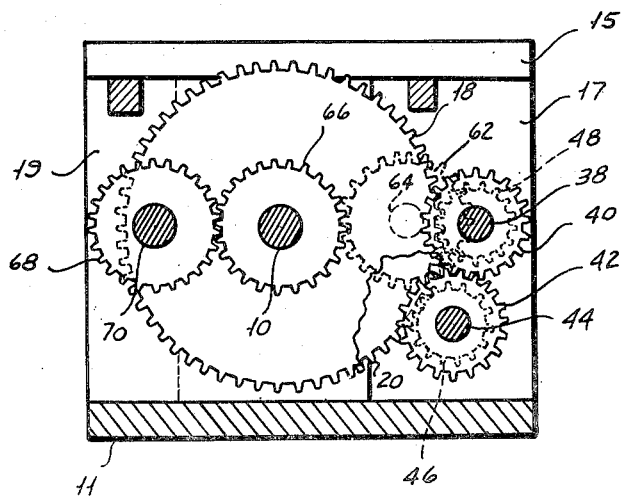
Figure 2 is a plan view of a torque amplifier showing the construction of the embodiment shown in Figure 1.

Referring now to Figures 2, 3 and 4, we have shown the actual construction of a torque amplifier built in accordance with our invention. The construction is mounted on a frame comprising a base plate 11. A plurality of upright members 13, 15, 17, 19, and 21 support suitable bearings in which the shafts 64, 44, 38 and 10 are mounted. The upright members are supported from the base 11 in any suitable manner. As can be seen by reference to Figure 3, gears 42 and 40 are of the same size, gears 46 and 48 are of the same size, and gears 18 and 20 are of the same size, so that gears 18 and 20 are driven at equal speeds and in opposite directions in a simple manner. It will be also observed that the member 26 comprises a thrust member positioned in a support 19 and is a separate member from the hub of the gear 18. The spring 30 bears against the member 26 and the motion of the member 26 to the left, as viewed in Figure 2, is limited by its supporting member 19. Similarly the member 28 is positioned in the support 17 and is a separate member from the hub of the gear 20 and its movement to the right is limited by the support 17. In this manner when the shaft moves to the right the motion of the gear 20 to the right is limited so that we do not have to depend solely on the difference in spring pressure exercised between the springs 30 and 32. If desired there may be a slight clearance between the disk 12 and both gears 18 and 20 in the neutral position. Similarly when the shaft moves to the left in Figure 2 the pressure between the clutch plate and the gear 20 is exercised by the spring 32 but the pressure of spring 30 is taken by the support member 19.

Between the input shaft 64 and the gear 62 we position a slip clutch comprising a clutch plate 90, a carrier 92 containing a plurality of balls 94, and a spring clutch plate 96. The spring clutch plate is carried by the shaft 64. The clutch plate 90 is carried by the hub 98 of the gear 62 and the balls 94 form the connection between the shaft 64 and the gear hub 98. This is merely a safety device which will prevent stripping of any of the gears in event the motor 36 is rendered inoperative, such as by failure of the electric potential driving it or the like.

The operation of our device is certain, smooth and rapid. Due to the fact that the rotating clutch gears are constantly in contact with the clutch disk there is no chattering and no appreciable lag. A tendency to lag is further reduced by the fact that our coacting friction surfaces have coefficients of friction rising as a function of the slip velocity. The coefficient of friction is always the maximum when the clutch is in a stationary position and hence a very slight increase in pressure will disturb the equilibrium which exists, and the torque delivered will be at its maximum at the very outset. The inertia of the driven parts, therefore, will be overcome initially (within the capacity of the device). Once the inertia of the driven parts is overcome, a lesser torque will be required to keep them in motion so that the fact that the coefficient of friction will decrease as the slip decreases (within limits) is not disadvantageous. Obviously there is a considerable friction exercised even when there is no slip between them. By a proper design of the area of friction surfaces a tremendously increased torque can be achieved to handle surprisingly large amounts of power with very little input energy. Our construction is compact, inexpensive to construct, and easy to maintain.

It will be seen that we have accomplished the objects of our invention.

We have provided a torque amplifier of simple construction which is certain in its operation, easy to maintain and inexpensive to manufacture. Our torque amplifier can deliver greatly increased outputs from comparatively small inputs over extended periods of time. Due to the fact that our device is not an on-off mechanism in that the friction surfaces are substantially in contact at all times, the output and the input will always be substantially in phase. Due to the fact that we use friction surfaces having rising coefficients of friction as a function of slip velocity the tendency to lag is substantially decreased.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A torque amplifier, including in combination a prime mover, a shaft, means for mounting said shaft for rotary and axial movement, a pair of clutch members mounted on said shaft for relative rotation therewith, means for rotating said clutch members from the prime mover at equal speeds in opposite directions, a clutch plate secured to said shaft for rotation therewith and positioned intermediate the clutch members, said shaft having a portion formed with screw threads, a nut formed with internal threads engaging said shaft screw threads, means for preventing axial movement of said nut, input means for rotating said nut to move the shaft to increase the friction between the clutch plate and one of said clutch members whereby to rotate the shaft from a clutch member in the same direction as that in which the nut is rotating, and output means driven by the shaft.

2. A torque amplifier including in combination a prime mover, a shaft means for mounting said shaft for rotary and axial movement, a pair of clutch members mounted on said shaft for relative rotation therewith, means for rotating said clutch members from the prime mover at equal speeds in opposite directions, coacting clutch means secured to said shaft for rotation therewith and adapted to engage said oppositely rotating clutch members, said shaft having a portion formed with screw threads, a nut formed with internal threads engaging said shaft threads, means for preventing axial movement of said nut, input means for rotating said nut to move the shaft to increase the friction between the coacting clutch means and one of said clutch members whereby to rotate said shaft from a clutch member in the same direction as that in which the nut is rotated, and output means driven by the shaft.

3. A torque amplifier as in claim 2 in which said clutch members comprise a pair of gears.

4. A torque amplifier as in claim 2 in which said clutch members comprise a pair of gears and said means for rotating the clutch members comprises a gear train.

5. A torque amplifier as in claim 2, including in combination friction lining material positioned between the clutch members and the coacting clutch means.

6. A torque amplifier as in claim 2 including in combination friction lining material positioned between said coacting clutch means and said clutch members, said friction lining material coacting with its friction surface to give a coefficient of friction rising as the function of the slip velocity between the coacting clutch means and the clutch members.

7. A torque amplifier as in claim 2 including in combination biasing means adapted to bring the clutch members into engagement with the coacting clutch means.

8. A torque amplifier as in claim 2 in which said input means includes a slip clutch.

9. A torque amplifier including in combination a shaft, a pair of oppositely rotating clutch members mounted on said shaft for relative rotation therewith, a pair of coacting clutch means mounted on said shaft for rotation therewith, means normally bringing said coacting clutch means into simultaneous engagement with both said oppositely rotating clutch members and to a position of dynamic balance whereby said shaft is stationary, means for increasing the frictional engagement between one of said clutch members and its coacting clutch means whereby to upset the dynamic balance to rotate the shaft in the direction of rotation of said clutch member, and means responsive to the rotation of the shaft for restoring the condition of dynamic balance.

10. A torque amplifier as in claim 9 in which frictional facing material is positioned between said coacting clutch means and said clutch members, said frictional facing material being carried by one of said coacting clutch surfaces and adapted to give with the other clutch surface a coefficient of friction rising as a function of the slip velocity.

11. A torque amplifier including in combination a prime mover, a shaft, means for mounting said shaft for rotary and axial movement, a pair of clutch members mounted on said shaft for relative rotation therewith, means for rotating said clutch members from the prime mover at equal speeds in opposite directions, a clutch plate secured to the shaft for rotation therewith and positioned intermediate the clutch members with its opposite surfaces closely adjacent to respective clutch members, said shaft having a portion formed with screw threads, a nut formed with internal threads engaging the shaft screw threads, means for preventing angular movement of said nut, input means for rotating said nut to move the shaft to bring one of said clutch plate surfaces into clutching contact with one of said clutch members whereby to rotate the shaft from a clutch member in the same direction as that in which the nut is rotating, and output means driven by the shaft.

12. A torque amplifier as in claim 11 in which said output means comprises a helical gear mounted on said shaft, an output shaft, a second helical gear meshing with said first helical gear and carried by said output shaft, the slope of the gears being such that the thrust generated by the intermeshing of the helical gears will increase the friction between the engaged clutch member and clutch plate surface.

MAURITS TEN BOSCH.
PAUL H. LANG.

REFERENCES CITED

The following references are of record in the file of this patent:

UNITED STATES PATENTS

| Number | Name | Date |
|---|---|---|
| 803,565 | Dina | Nov. 7, 1905 |
| 2,311,010 | Vickers | Feb. 16, 1943 |
| 2,391,123 | Carliss et al. | Dec. 18, 1945 |